(12) United States Patent
Noda et al.

(10) Patent No.: US 11,698,078 B2
(45) Date of Patent: Jul. 11, 2023

(54) ROTATING MACHINE AND TURBOCHARGER

(71) Applicant: MITSUBISHI HEAVY INDUSTRIES ENGINE & TURBOCHARGER, LTD., Sagamihara (JP)

(72) Inventors: Yoshitomo Noda, Tokyo (JP); Kengo Imaoka, Tokyo (JP); Yukiho Ishida, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/041,813

(22) PCT Filed: Mar. 30, 2018

(86) PCT No.: PCT/JP2018/013668
§ 371 (c)(1),
(2) Date: Sep. 25, 2020

(87) PCT Pub. No.: WO2019/187023
PCT Pub. Date: Oct. 3, 2019

(65) Prior Publication Data
US 2021/0025403 A1 Jan. 28, 2021

(51) Int. Cl.
*F04D 29/063* (2006.01)
*F04D 29/059* (2006.01)

(52) U.S. Cl.
CPC ......... *F04D 29/063* (2013.01); *F04D 29/059* (2013.01); *F05D 2220/40* (2013.01); *F05D 2240/54* (2013.01); *F05D 2260/98* (2013.01)

(58) Field of Classification Search
CPC ................ F04D 29/063; F04D 29/059; F05D 2220/40; F05D 2260/98; F05D 2240/54
See application file for complete search history.

(56) References Cited

U.S. PATENT DOCUMENTS 2,284,948 A * 6/1942 Combs ...................... F04D 7/00
310/90
3,728,857 A * 4/1973 Nichols ................... F01D 25/22
415/110

(Continued)

FOREIGN PATENT DOCUMENTS

| CN | 101014753 A | 8/2007 |
| CN | 104813044 A | 7/2015 |

(Continued)

OTHER PUBLICATIONS

International Search Report, dated Jun. 12, 2018, for International Appication No. PCTIJP2018/013668, with an English translation.

(Continued)

*Primary Examiner* — Courtney D Heinle
*Assistant Examiner* — Ryan C Clark
(74) *Attorney, Agent, or Firm* — Birch, Stewart, Kolasch & Birch, LLP

(57) ABSTRACT

On an inner circumferential surface (25a) of a housing (25) opposed to an outer circumferential surface (37a, 37b) of an outer ring, toward a front side in a rotation direction (B) of a rotation shaft (21), a first groove (41H, 41I) is formed as a groove portion for guiding an oil (39) in a direction toward a first oil supply hole (41D, 41E).

13 Claims, 12 Drawing Sheets

(56) References Cited

U.S. PATENT DOCUMENTS

| | | | |
|---|---|---|---|
| 9,745,992 B2* | 8/2017 | Barber | F16C 19/18 |
| 9,790,950 B2* | 10/2017 | Uneura | F04D 29/051 |
| 11,066,983 B2* | 7/2021 | Futae | F16N 7/36 |
| 2004/0008912 A1* | 1/2004 | Gomyo | F16C 43/02 |
| | | | 384/100 |
| 2004/0008913 A1* | 1/2004 | Uesugi | F16C 33/107 |
| | | | 384/100 |
| 2005/0287018 A1 | 12/2005 | Mavrosakis | |
| 2015/0330442 A1 | 11/2015 | Futae et al. | |
| 2017/0009810 A1 | 1/2017 | Futae et al. | |
| 2017/0058909 A1* | 3/2017 | Barber | F16C 33/6637 |
| 2017/0108035 A1* | 4/2017 | Hinds | F16C 17/18 |
| 2018/0003223 A1 | 1/2018 | Schmidt | |

FOREIGN PATENT DOCUMENTS

| | | |
|---|---|---|
| CN | 105940229 A | 9/2016 |
| CN | 107109963 A | 8/2017 |
| JP | 4-159421 A | 6/1992 |
| JP | 2012-167606 A | 9/2012 |
| JP | 2016-89795 A | 5/2016 |
| JP | 6079057 B2 | 2/2017 |
| WO | WO 2006/004654 A1 | 1/2006 |

OTHER PUBLICATIONS

Written Opinion of the International Searching Authority, dated Jun. 12, 2018, for International Application No. PCT/JP2018/013668, with an English translation.

\* cited by examiner

ROTATING MACHINE AND TURBOCHARGER

TECHNICAL FIELD

The present invention relates to a rotating machine and a turbocharger.

BACKGROUND ART

A rotating machine has a rotating shaft extending in an axis direction, a bearing that supports the rotating shaft in a state in which the rotating shaft is rotatable around its axis, and a housing that forms a clearance, to which oil is supplied, between the bearing and an outer ring.

In a state where the rotating shaft is rotated, when oil is supplied between an outer peripheral surface of the outer ring and an inner peripheral surface of the housing, a portion where the oil is disposed between the outer peripheral surface of the outer ring and the inner peripheral surface of the housing functions as oil film damper (for example, refer to PTL 1).

As a device including such a rotating machine, there is a turbocharger, for example. The turbocharger compresses intake air to an engine by rotating and driving a turbine wheel with exhaust gas from the engine.

CITATION LIST

Patent Literature

[PTL 1] Japanese Patent No. 6079057

SUMMARY OF INVENTION

Technical Problem

In the rotating machine configured as described above, there is a possibility that the oil present between the inner peripheral surface of the housing and the outer peripheral surface of the outer ring may leak from an end of the outer ring to the outside of the outer ring and the function of the oil film damper may deteriorate.

Accordingly, an object of the present invention is to provide a rotating machine and a turbocharger which can suppress that oil supplied between an inner peripheral surface of a housing and an outer peripheral surface of an outer ring leaks from an end of the outer ring to the outside of the outer ring.

Solution to Problem

In order to solve the problem, a rotating machine according to an aspect of the present invention includes a rotating shaft extending along an axis; a bearing which has an inner ring externally fitted onto the rotating shaft, an outer ring provided on an outer peripheral surface side of the inner ring, and rolling bodies disposed between the inner ring and the outer ring, and supports the rotating shaft such that the rotating shaft is rotatable around the axis; and a housing which has an inner peripheral surface that forms a clearance, in which oil is disposed, between the inner peripheral surface and an outer peripheral surface of the outer ring, and a first oil supply hole that supplies the oil to the clearance, in which a groove portion, which guides the oil in a direction toward the first oil supply hole as the groove portion is directed to a rotation direction front side of the rotating shaft, is formed on at least one of the outer peripheral surface of the outer ring and the inner peripheral surface of the housing facing the outer peripheral surface of the outer ring.

According to the present invention, by forming the groove portion, which guides the oil in a direction toward the first oil supply hole as the groove portion is directed to a rotation direction front side of the rotating shaft, on at least one of the outer peripheral surface of the outer ring and the inner peripheral surface of the housing facing the outer peripheral surface of the outer ring, the oil that is moved in a direction toward the end of the outer ring can be guided in a direction toward the first oil supply hole.

As a result, it is possible to suppress that the oil supplied between the housing and the outer ring leaks from the end of the outer ring to the outside of the outer ring.

In the rotating machine according to the aspect of the present invention, the groove portion may include a first groove, the first groove may be formed in an outer side region which is between the first oil supply hole and one of both ends of the outer ring which is close to a forming position of the first oil supply hole in the axis direction, and the first groove may be inclined in a direction toward the first oil supply hole from the end of the outer ring.

In this manner, by forming the first groove inclined in the direction toward the first oil supply hole from the end of the outer ring, in the outer side region, which is positioned between the first oil supply hole and one of both ends of the outer ring which is close to the forming position of the first oil supply hole in the axis direction, the oil which is moved toward the end of the outer ring can be moved in the direction toward the first oil supply hole from the end of the outer ring along the first groove.

As a result, it is possible to suppress that the oil supplied between the housing and the outer ring leaks from the end of the outer ring to the outside of the outer ring.

In the rotating machine according to the aspect of the present invention, a plurality of the first grooves may be formed in the axis direction.

In this manner, by forming a plurality of first grooves in the axis direction, an amount of oil can be moved in the direction toward the first oil supply hole from the end of the outer ring. As a result, it is possible to reduce the amount of oil leaking from the end of the outer ring.

In the rotating machine according to the aspect of the present invention, the groove portion may include a second groove, the second groove may be formed in a central region positioned closer to a central side of the outer ring than the outer side region, and the second groove may be inclined in a direction opposite to the first groove or the same direction as the first groove.

In this manner, by forming the second groove inclined in the direction opposite to the first groove or the same direction as the first groove, in the central region positioned closer to the central side of the outer ring than the outer side region, the oil supplied from the first oil supply hole can be moved in the direction toward the first oil supply hole from the central region.

In the rotating machine according to the aspect of the present invention, the groove portion may include a third groove, the third groove may be formed between a forming position of the first groove and the first oil supply hole in the outer side region, and is inclined in a direction opposite to the first groove, and one end of the first groove and one end of the third groove may be connected on the rotation direction front side.

In this manner, by forming the third groove, which is inclined in the direction opposite to the first groove and of which one end is connected to one end of the first groove on the rotation direction front side, between the forming position of the first groove and the first oil supply hole in the outer side region, the oil can be likely to accumulate in a portion (oil reservoir portion) where one end of the first groove and one end of the third groove is connected in a state where the rotating shaft is rotated. As a result, since it is difficult for the oil to be moved in the direction toward the end of the outer ring, it is possible to suppress that the oil leaks from the end of the outer ring.

In the rotating machine according the aspect of the present invention, a plurality of the groove portions each including the first groove and the third groove may be formed at intervals in a circumferential direction of the rotating shaft.

In this manner, by forming a plurality of groove portions each including the first groove and the third groove at intervals in the circumferential direction of the rotating shaft, it is possible to further suppress that the oil leaks from the end of the outer ring.

In the rotating machine according to the aspect of the present invention, the groove portion may have a fourth groove which is formed in the outer side region and is inclined in the same direction as the first groove.

In this manner, by providing the fourth groove inclined in the same direction as the first groove, the oil can be guided in the direction toward the first oil supply hole from the end of the outer ring along the fourth groove. As a result, it is possible to further suppress that oil leaks from the end of the outer ring.

In the rotating machine according to the aspect of the present invention, a length of the fourth groove may be longer than a length of the first groove, and one end of the fourth groove may be connected to the other end of the third groove.

In this manner, by providing the fourth groove of which the length is longer than the length of the first groove and one end is connected to the other end of the third groove, it is possible to further suppress that the oil leaks from the end of the outer ring.

In the rotating machine according to the aspect of the present invention, a length of the fourth groove may be longer than a length of the first groove, and the fourth groove may be separated from the first groove and the third groove.

In this manner, by providing the fourth groove configured as described above, it is possible to further suppress that the oil leaks from the end of the outer ring.

In the rotating machine according to the aspect of the present invention, the outer ring may have a recessed portion which is formed in a portion facing the first oil supply hole, a second oil supply hole which is formed to penetrate the portion where the recessed portion is formed in a direction toward the rotating shaft, and supplies the oil to the rolling bodies, and an oil discharge hole which is formed on a side opposite to a side where the second oil supply hole is formed, and discharges the oil.

By providing the outer ring configured as described above, the oil can be supplied to the rolling bodies, and unnecessary oil can be discharged to the outside of the outer ring.

A turbocharger according to another aspect of the present invention includes the rotating machine; a compressor wheel provided to one end portion of the rotating shaft; and a turbine wheel provided to the other end of the rotating shaft.

The turbocharger configured as described above can obtain a function of a stable oil film damper, and therefore can be driven in a stable state.

Advantageous Effects of Invention

According to the present invention, it is possible to suppress that the oil supplied between the housing and the outer ring leaks from the end of the outer ring to the outside of the outer ring.

DESCRIPTION OF EMBODIMENTS

Hereinafter, embodiments in which the present invention is applied will be described in detail with reference to the drawings.

First Embodiment

A turbocharger 10 according to an embodiment of the present invention will be described with reference to FIGS.

Figure 1:
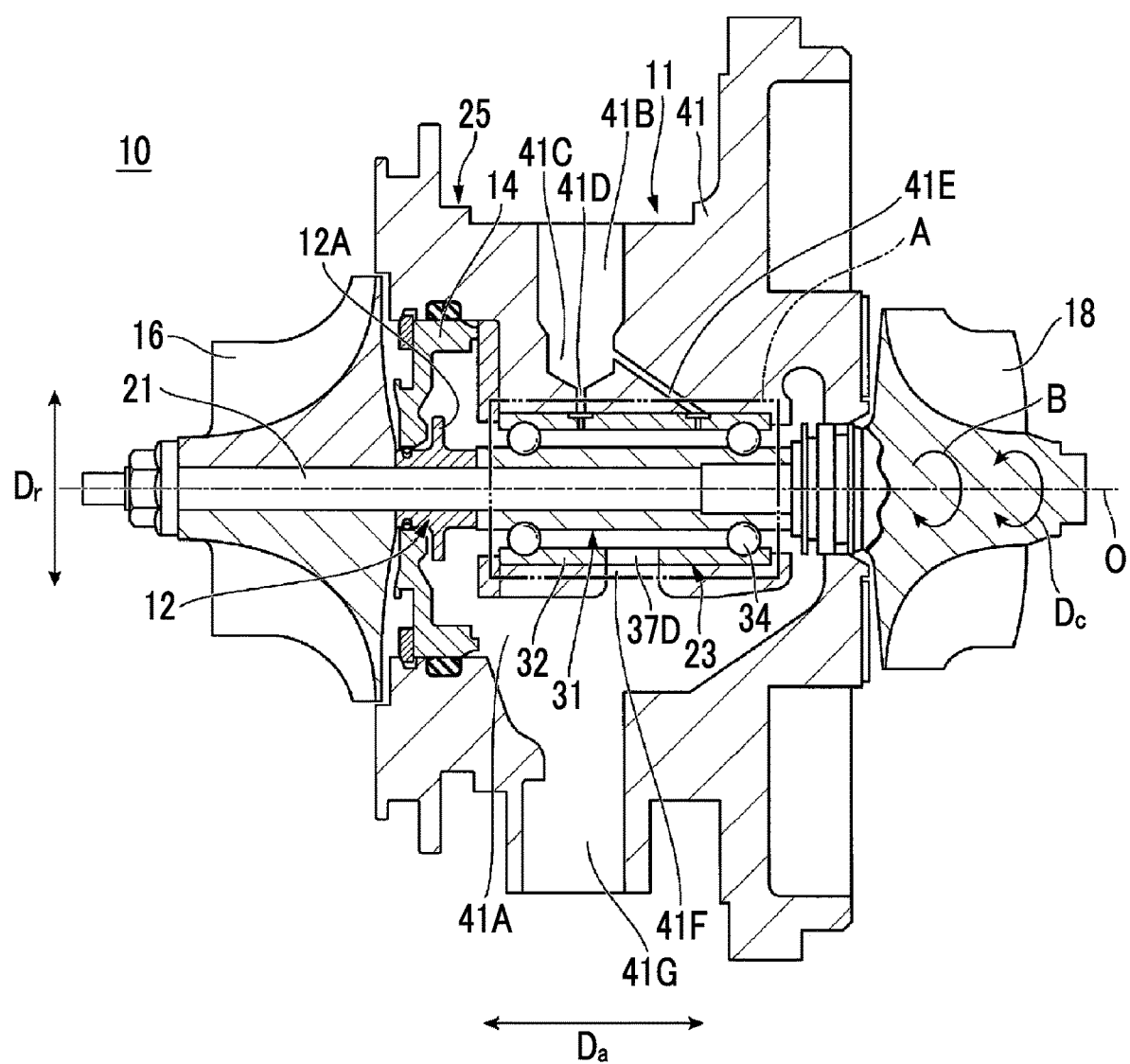
FIG. 1 is a sectional view schematically illustrating a schematic configuration of a turbocharger including a rotating machine according to a first embodiment of the present invention.

1 to 3. In FIG. 1, O indicates an axis of a rotating shaft 21 (hereinafter, referred to as an "axis O"), Da indicates an axis direction in which the axis O of the rotating shaft 21 extends (hereinafter, referred to as an "axis direction Da"), Dr indicates a radial direction of the rotating shaft (hereinafter referred to as a "radial direction Dr"), and Dc indicates a circumferential direction around the rotating shaft 21 (hereinafter, referred to as a "circumferential direction Dc").

Figure 2:
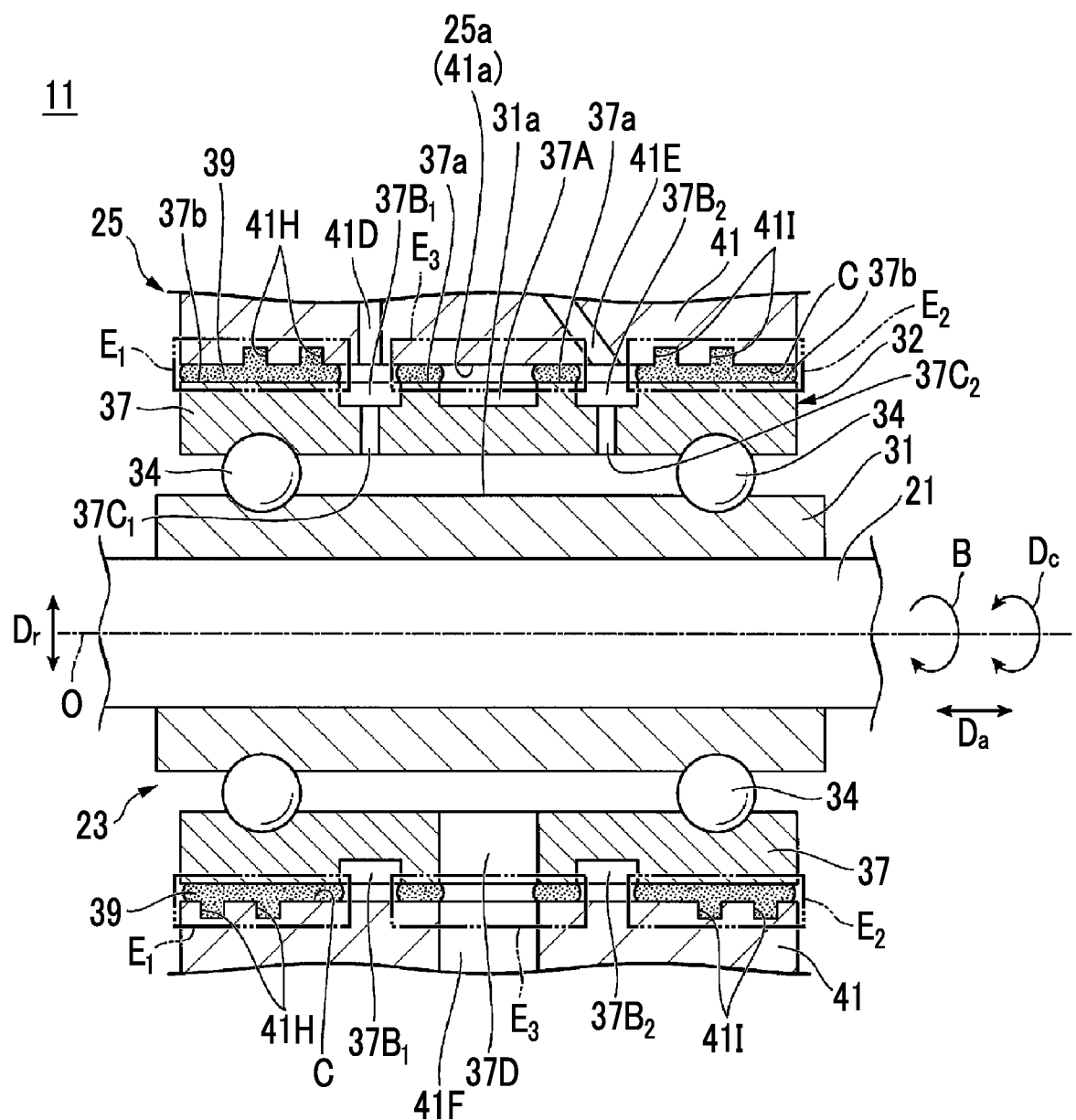
FIG. 2 is a schematic sectional view enlarging a portion surrounded by a region A in the rotating machine illustrated in FIG. 1.

In FIG. 2, $E_1$ indicates a region from a forming position of a first oil supply hole 41D to one end of an outer ring 32 (an end of both ends of the outer ring 32, which is close to the forming position of the first oil supply hole 41D) in the axis direction Da (hereinafter, referred to as an "outer side region $E_1$"), $E_2$ indicates a region from a forming position of a first oil supply hole 41E to the other end of the outer ring 32 (an end of both ends of the outer ring 32, which is close to the forming position of the first oil supply hole 41E) in the axis direction Da (hereinafter, referred to as an "outer side region $E_2$"), and $E_3$ indicates a region disposed between the outer side region $E_1$ and the outer side region $E_2$ (hereinafter, referred to as a "central region $E_3$").

Further, in FIG. 2, the same components as the structure illustrated in FIG. 1 are denoted by the same reference numerals.

Figure 3:
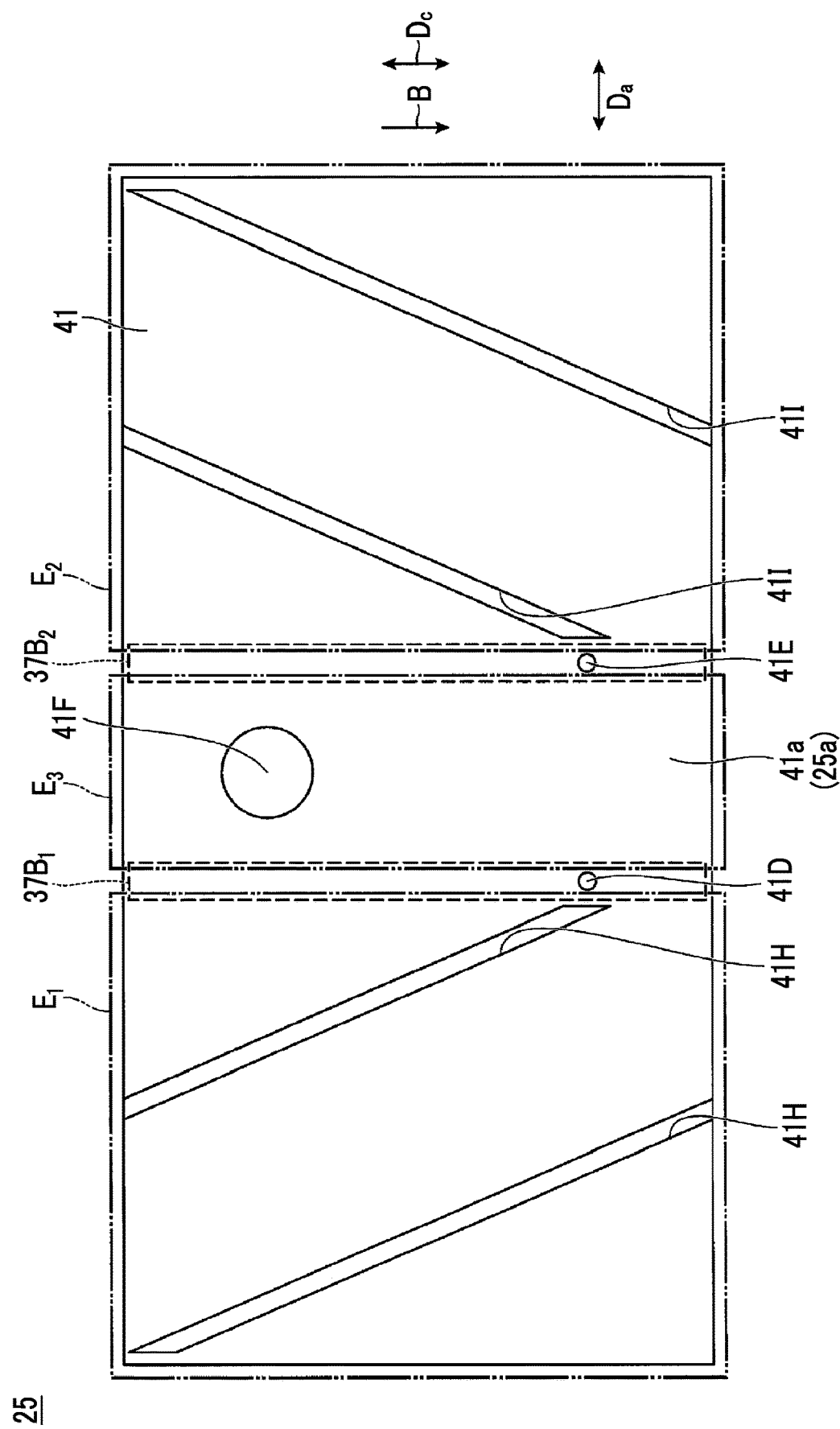
FIG. 3 is a developed diagram schematically illustrating a portion of a housing illustrated in FIG. 2 when viewed from an inner peripheral surface side of the housing, the portion facing an outer peripheral surface of a bearing in a radial direction.

In FIG. 3, B indicates a direction in which the rotating shaft 21 is rotated (hereinafter, referred to as a "rotation direction B").

In the following description, a front side of the direction in which the rotating shaft 21 is rotated is referred to as a "rotation direction B front side". In FIG. 3, the same components as the structure illustrated in FIG. 2 are denoted by the same reference numerals.

In FIG. 3, for convenience of the description, the positions of second recessed portions $37B_1$ and $37B_2$ are also illustrated.

The turbocharger 10 has a rotating machine 11, a thrust sleeve 12, an annular member 14, a compressor wheel 16, and a turbine wheel 18.

The rotating machine 11 has the rotating shaft 21, a bearing 23 as a radial bearing, and a housing 25.

A portion of the rotating shaft 21 protrudes to the outside of the housing 25, and the remaining portion of the rotating shaft 21 is housed in the housing 25. A seal member is disposed between the other end portion of the housing 25 and the rotating shaft 21 on a side where the turbine wheel 18 is disposed.

The bearing 23 has an inner ring 31, the outer ring 32, and rolling bodies 34. The inner ring 31 is a cylindrical member, and is externally fitted onto the rotating shaft 21.

The outer ring 32 has an outer ring main body 37, a first recessed portion 37A, second recessed portions $37B_1$ and $37B_2$, outer peripheral surfaces 37a and 37b, second oil supply holes $37C_1$ and $37C_2$, and oil discharge hole 37D.

The outer ring main body 37 is a cylindrical member. The outer ring main body 37 is fixed to an inner side of the housing 25 to face an outer peripheral surface 31a of the inner ring 31 in a state where a clearance C is formed between the outer ring main body 37 and the inner peripheral surface 25a of the housing 25.

The first recessed portion 37A is formed at a central portion of the outer ring main body 37. The first recessed portion 37A extends in the circumferential direction of the outer ring main body 37. The first recessed portion 37A is a ring-shaped groove.

The second recessed portions $37B_1$ and $37B_2$ are formed on the outer ring main body 37 so as to interpose the first recessed portion 37A therebetween from both sides in the axis direction Da. The second recessed portion $37B_1$ is formed on one side of the outer ring 32. The second recessed portion $37B_2$ is formed on the other side of the outer ring 32.

Each of the second recessed portions $37B_1$ and $37B_2$ extends in the circumferential direction of the outer ring main body 37. The second recessed portions $37B_1$ and $37B_2$ are ring-shaped grooves.

The outer peripheral surfaces 37a are surfaces disposed between the first recessed portion 37A and the second recessed portions $37B_1$ and $37B_2$. The outer peripheral surface 37a faces an inner peripheral surface 25a of the housing 25 in the radial direction Dr. The outer peripheral surfaces 37a are disposed on both side of the first recessed portion 37A in the axis direction Da.

The outer peripheral surfaces 37b are surfaces disposed on the outer sides of the second recessed portions $37B_1$ and $37B_2$. Two outer peripheral surfaces 37b are provided in the axis direction Da. The outer peripheral surface 37b faces the inner peripheral surface 25a of the housing 25 in the radial direction Dr.

Oil 39 supplied from the housing 25 is disposed in the clearance C formed between the outer peripheral surfaces 37a and 37b and the inner peripheral surface 25a of the housing 25 in a state where the rotating shaft 21 is rotated.

In a state where the rotating shaft 21 is rotated, a structure including the outer peripheral surfaces 37a and 37b, the inner peripheral surface 25a of the housing 25 facing the outer peripheral surfaces 37a and 37b, and the oil 39 disposed between the outer peripheral surfaces 37a and 37b and the inner peripheral surface 25a functions as oil film damper.

The second oil supply hole $37C_1$ is formed to penetrate a portion of the outer ring main body 37 in the radial direction Dr, which is positioned on an upper end portion and in which the second recessed portion $37B_1$ is formed.

The second oil supply hole $37C_2$ is formed to penetrate a portion of the outer ring main body 37 in the radial direction Dr, which is positioned on an upper end portion and in which the second recessed portion $37B_2$ is formed.

The second oil supply holes $37C_1$ and $37C_2$ configured as described above supply the oil 39, which is supplied from the housing 25, to a portion (specifically, a plurality of rolling bodies 34) between the inner ring 31 and the outer ring 32.

The oil discharge hole 37D is formed to penetrate a lower end portion of the outer ring main body 37 in the radial direction Dr. The oil discharge hole 37D is formed in the outer ring main body 37 to be positioned on a side opposite to the forming regions of the second oil supply holes $37C_1$ and $37C_2$.

The oil discharge hole 37D is a hole for discharging the oil, which is supplied from the housing 25 and passes through the inside of the bearing 23, to the outside of the bearing 23.

The housing 25 has a main housing body 41, oil supply pipe connection port 41B, oil distribution portion 41C, the first oil supply holes 41D and 41E, a first oil discharge port 41F, a second oil discharge port 41G, and first grooves 41H and 41I as groove portions.

The main housing body 41 extends in the axis direction Da. A housing space 41A which extends in the axis direction Da and houses the thrust sleeve 12, the annular member 14, the remaining portion of the rotating shaft 21, and the bearing 23 is formed inside the main housing body 41.

The main housing body 41 has an inner peripheral surface 41a which faces the outer peripheral surfaces 37a and 37b of the outer ring main body 37. The inner peripheral surface 41a of the main housing body 41 is a surface corresponding to the inner peripheral surface 25a of the housing 25.

The oil supply pipe connection port 41B is formed on an outer circumferential portion of the main housing body 41, which is positioned on an upper portions side. One end of the oil supply pipe connection port 41B is exposed from the outer peripheral surface of the main housing body 41. The oil supply pipe connection port 41B extends in a direction toward the bearing 23 from the outer peripheral surface of the main housing body 41.

An end portion of oil supply pipe (not illustrated) for supplying the oil 39 is connected to the oil supply pipe connection port 41B.

The oil distribution portion 41C is formed in a portion of the main housing body 41, which is positioned on an inner side of the oil supply pipe connection port 41B.

The oil distribution portion 41C is a space communicating with the oil supply pipe connection port 41B. The oil distribution portion 41C extends in a direction toward the bearing 23 from the oil supply pipe connection port 41B.

The first oil supply hole 41D is formed to penetrate the main housing body 41 positioned between the oil distribution portion 41C and the second recessed portion $37B_1$. One end of the first oil supply hole 41D communicates with the oil distribution portion 41C, and the other end of the first oil supply hole 41D is exposed from the inner peripheral surface 41a.

The other end of the first oil supply hole 41D faces the second recessed portion $37B_1$ in the radial direction Dr. The first oil supply hole 41D supplies the oil 39 supplied from the oil distribution portion 41C to the second recessed portion $37B_1$.

The first oil supply hole 41E is formed to penetrate the main housing body 41 positioned between the oil distribution portion 41C and the second recessed portion $37B_2$. One end of the first oil supply hole 41E communicates with the oil distribution portion 41C, and the other end of the first oil supply hole 41E is exposed from the inner peripheral surface 41a.

The other end of the first oil supply hole 41E faces the second recessed portion 37B2 in the radial direction Dr. The first oil supply hole 41E supplies the oil 39 supplied from the oil distribution portion 41C to the second recessed portion $37B_2$.

The first oil discharge port 41F is formed to penetrate the main housing body 41 positioned directly below the outer ring 32, in the radial direction Dr. The first oil discharge port 41F is disposed to face the oil discharge hole 37D in the radial direction Dr. The first oil discharge port 41F guides the oil 39 discharged from the bearing 23 toward the second oil discharge port 41G.

The second oil discharge port 41G is formed to penetrate the main housing body 41 positioned below the first oil discharge port 41F, in the radial direction Dr. The second oil discharge port 41G discharges the oil 39 passing through the first oil discharge port 41F to the outside of the main housing body 41.

One first groove 41H is formed in the outer side region $E_1$.

The first groove 41H is inclined in a direction toward the first oil supply hole 41D from one end of the outer ring 32. The first groove 41H is a spiral groove inclined in a direction toward the first oil supply hole 41D from one end of the outer ring 32.

The first groove 41H guides the oil 39 in a direction toward the first oil supply hole 41D as the first groove 41H is directed to the rotation direction B front side of the rotating shaft 21.

The outer side end of the first groove 41H is formed not to reach the one end of the housing 25. The inner side end of the first groove 41H is disposed on the outer side of the second recessed portion $37B_1$.

The number of first grooves 41H is preferably one or more, and is not limited to the number (one) illustrated in FIG. 3.

One first groove 41I is formed in the outer side region $E_2$.

The first groove 41I is inclined in a direction toward the first oil supply hole 41E from the other end of the outer ring 32. The first groove 41I is a spiral groove inclined in a direction opposite to the first groove 41H.

The first groove 41I guides the oil 39 in a direction toward the first oil supply hole 41E as the first groove 41I is directed to the rotation direction B front side of the rotating shaft 21.

The outer side end of the first groove 41I is formed not to reach the other end of the housing 25. The inner side end of the first groove 41I is disposed on the outer side of the second recessed portion $37B_2$.

The number of first grooves 41I is preferably one or more, and is not limited to the number (one) illustrated in FIG. 3.

By forming the first grooves 41H and 41I configured as described above on the inner peripheral surface 41a of the main housing body 41 facing the outer ring 32, the oil 39 which is moved in the direction toward the end of the outer ring 32 can be guided in a direction toward the first oil supply holes 41D and 41E along the first grooves 41H and 41I.

As a result, it is possible to suppress that the oil 39 supplied between the housing 25 and the outer ring 32 leaks from the end of the outer ring 32 to the outside of the outer ring 32.

The thrust sleeve 12 is provided on the outer peripheral surface of the rotating shaft 21 positioned between the inner ring 31 and the compressor wheel 16. The thrust sleeve 12 has a thrust collar 12A protruding to the outer side of the radial direction Dr.

The annular member 14 is a member extending to the outer side of the radial direction Dr from the thrust sleeve 12 positioned between the thrust collar 12A and the compressor wheel 16.

The annular member 14 is in contact with the thrust sleeve 12 via a seal member on the inner side of the radial direction Dr, and is in contact with the main housing body 41 via a seal member on the outer side of the radial direction Dr.

Further, the inner side portion of the annular member 14 abuts on the thrust collar 12A in the axis direction Da. This portion functions as a thrust bearing.

The compressor wheel 16 is provided to the portion (portion including one end portion) of the rotating shaft 21 protruding from the housing 25. A compressor housing (not illustrated) is provided on the outer side of the compressor wheel 16.

The turbine wheel 18 is provided to the other end portion of the rotating shaft 21. A turbine housing (not illustrated) is provided on the outer side of the turbine wheel 18.

With the rotating machine 11 of the first embodiment, by forming the first grooves 41H and 41I inclined in the direction toward the first oil supply holes 41D and 41E from the end of the outer ring 32, in the outer side regions $E_1$ and $E_2$, which are positioned between the first oil supply holes 41D and 41E and the ends of the outer ring 32 close to the forming positions of the first oil supply holes 41D and 41E in the axis direction Da, the oil 39 which is moved toward the end of the outer ring 32 can be moved in a direction toward the first oil supply holes 41D and 41E from the end of the outer ring 32 along the first grooves 41H and 41I.

As a result, it is possible to suppress that the oil 39 supplied between the housing 25 and the outer ring 32 leaks from the end of the outer ring to the outside of the outer ring.

The turbocharger 10 including the above-described rotating machine 11 can obtain the function of the stable oil film damper, and therefore can be driven in a stable state.

Figure 4:
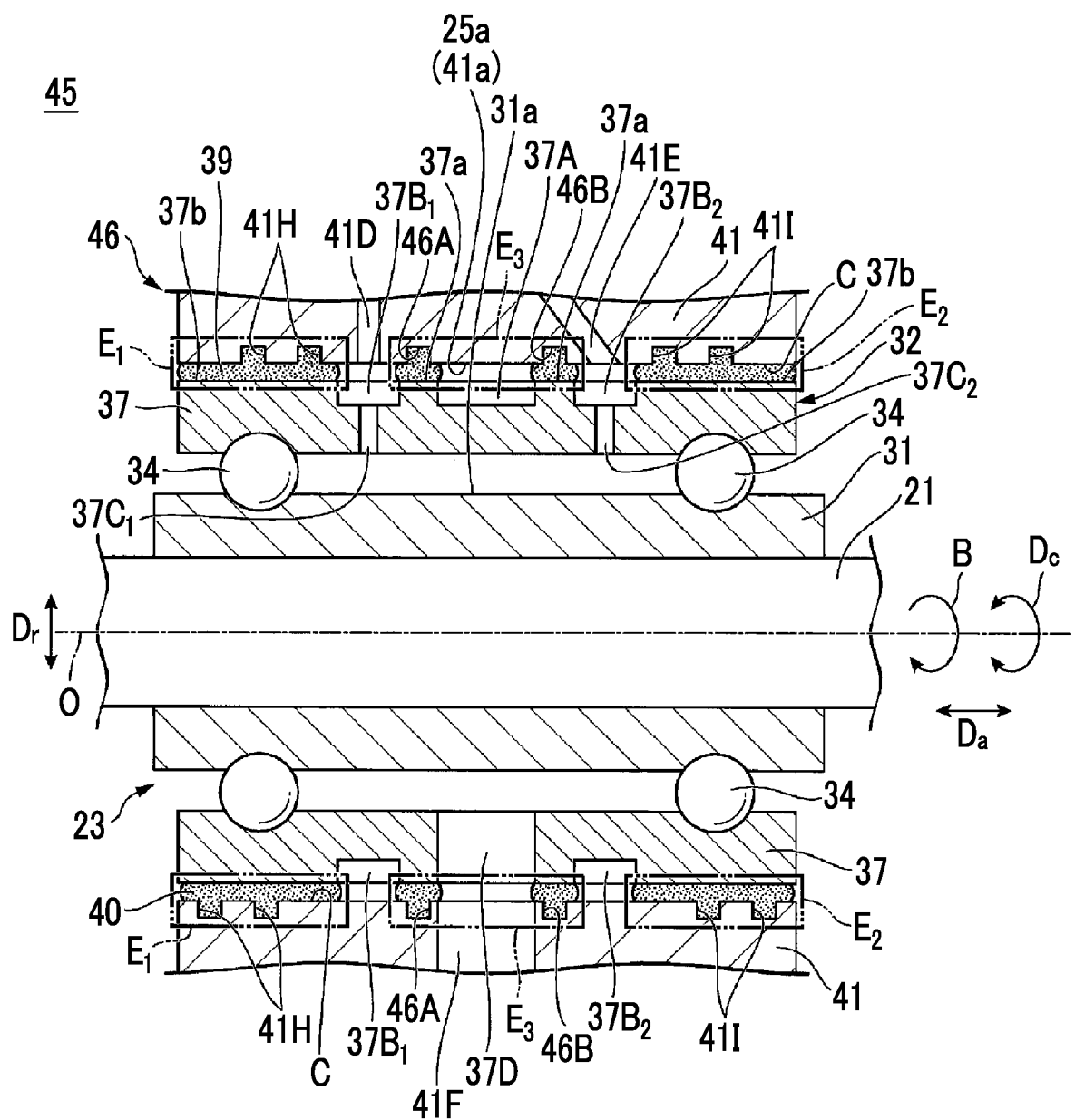
FIG. 4 is a sectional view schematically illustrating a principal section of a rotating machine according to a first modification example of the first embodiment of the present invention.
Figure 5:
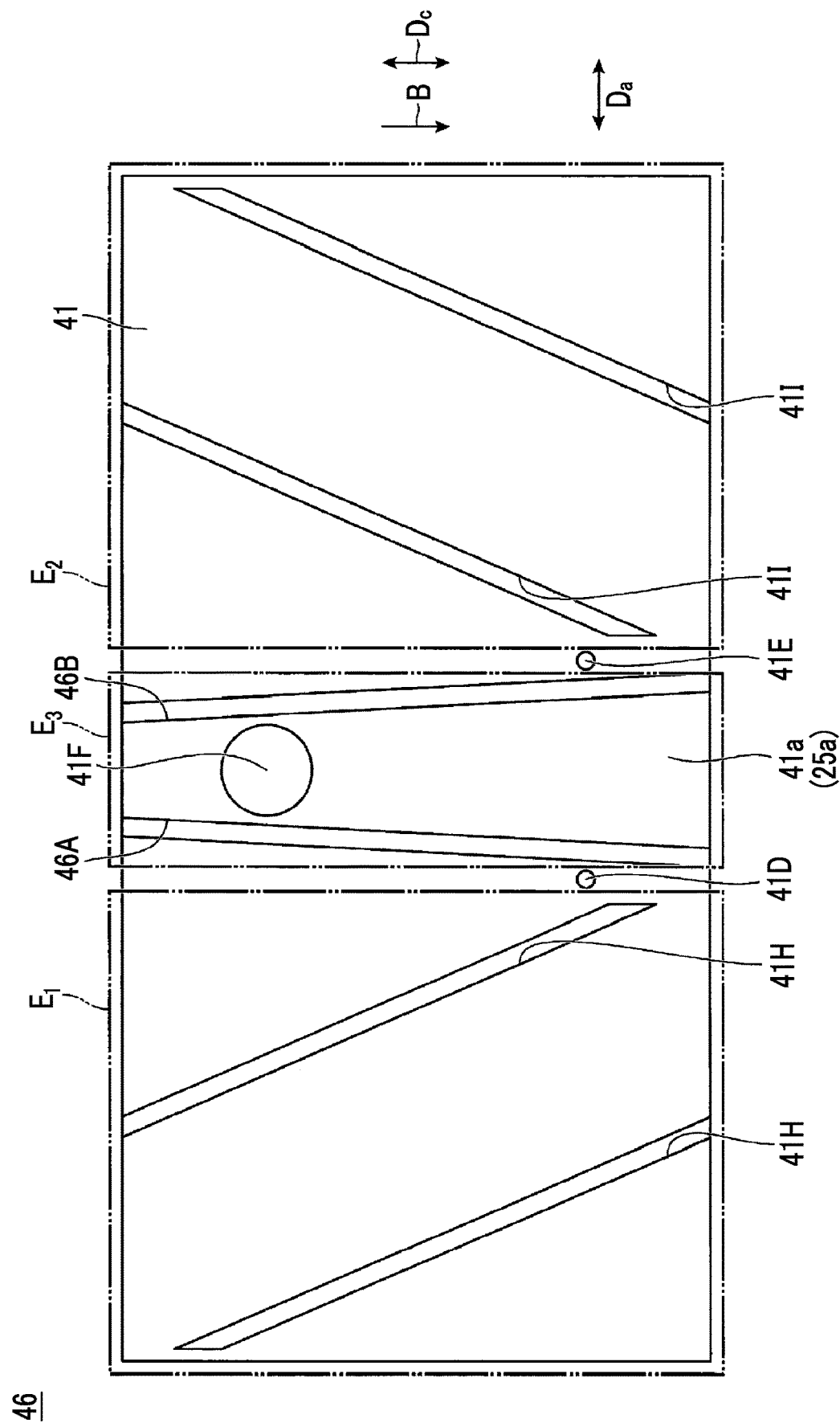
FIG. 5 is a diagram schematically illustrating a housing illustrated in FIG. 4 in a state where the housing is developed into a plate shape when viewed from the inner surface side of the housing.

Next, a rotating machine 45 of a first modification example of the first embodiment will be described with reference to FIGS. 4 and 5. In FIG. 4, the same components as the structure illustrated in FIG. 2 are denoted by the same reference numerals. In FIG. 5, the same components as the structure illustrated in FIG. 4 are denoted by the same reference numerals.

The rotating machine 45 is configured in the same manner as the rotating machine 11 except that the rotating machine 45 has a housing 46 instead of the housing 25 constituting the rotating machine 11 of the first embodiment.

The housing 46 is configured in the same manner as the housing 25 except that second grooves 46A and 46B are formed on the housing 25 described in the first embodiment.

That is, in the rotating machine 45 of the first modification example of the first embodiment, the groove portion includes the first grooves 41H and 41I, and the second grooves 46A and 46B.

The second grooves 46A and 46B are formed in the central region $E_3$ which is positioned closer to the central side of the outer ring 32 than the outer side regions $E_1$ and $E_2$.

The second grooves 46A and 46B are formed on the inner peripheral surface 41a of the main housing body 41 so as to avoid the second oil supply holes $37C_1$ and $37C_2$ and the first oil discharge port 41F.

The second groove 46A is disposed between the first oil discharge port 41F and the second oil supply hole $37C_1$. The second groove 46A is inclined in a direction opposite to the first groove 41H.

The second groove 46B is disposed between the first oil discharge port 41F and the second oil supply hole $37C_2$. The second groove 46B is inclined in a direction opposite to the first groove 41I.

With the rotating machine 45 of the first modification example of the first embodiment, by forming the second grooves 46A and 46B, which are inclined in the directions opposite to the first grooves 41H and 41I, in the central region $E_3$ positioned closer to the central side of the outer ring 32 than the outer side regions $E_1$ and $E_2$, the oil 39 supplied from the first oil supply holes 41D and 41E can be moved in a direction toward the first oil supply holes 41D and 41E.

For example, in FIG. 5, a case in which one second groove 46A and one second groove 46B are formed is described as an example, but the number of each of the second grooves 46A and 46B is preferably one or more, and is not limited to the number illustrated in FIG. 5.

Further, the position where the second grooves 46A and 46B are formed is preferably the central region $E_3$, but is not limited to the forming position of the second grooves 46A and 46B illustrated in FIG. 5.

Figure 6:
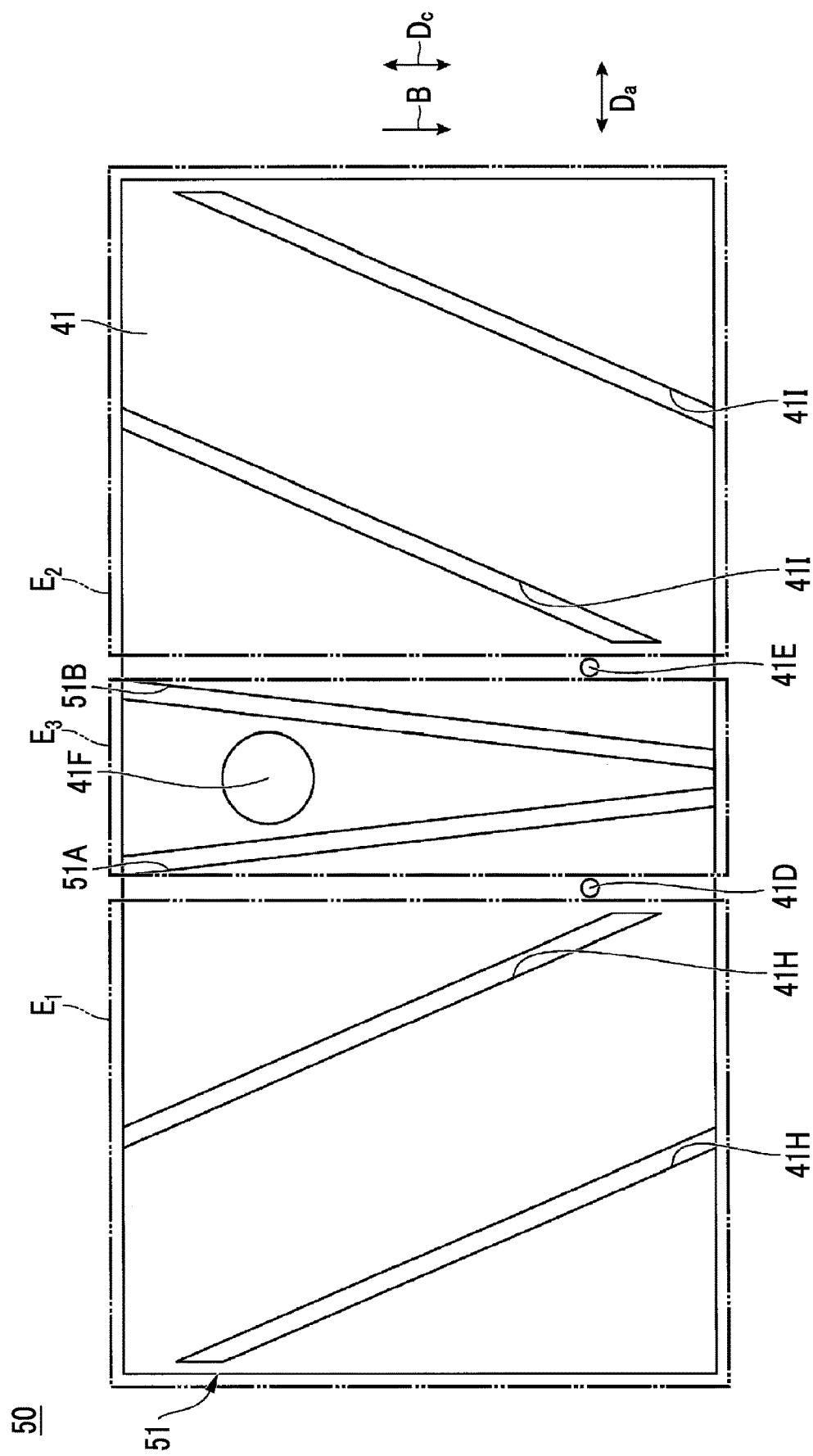
FIG. 6 is a diagram schematically illustrating a housing according to a second modification example of the first embodiment of the present invention in a state where the housing is developed into a plate shape when viewed from the inner surface side of the housing.

Next, a rotating machine 50 of a second modification example of the first embodiment will be described with reference to FIG. 6. In FIG. 6, the same components as the structure illustrated in FIG. 5 are denoted by the same reference numerals. Among the components of the rotating machine 50, only a housing 51 is illustrated in FIG. 6.

The rotating machine 50 is configured in the same manner as the rotating machine 11 except that the rotating machine 50 has a housing 51 instead of the housing 25 constituting the rotating machine 11 of the first embodiment.

The housing 51 is configured in the same manner as the housing 25 except that second grooves 51A and 51B are formed on the housing 25 described in the first embodiment.

That is, in the second modification example of the first embodiment, the groove portion includes the first grooves 41H and 41I, and the second grooves 51A and 51B.

The second grooves 51A and 51B are formed in the central region $E_3$. The second grooves 51A and 51B are formed on the inner peripheral surface 41a of the main housing body 41 so as to avoid the second oil supply holes $37C_1$ and $37C_2$ and the first oil discharge port 41F.

The second groove 51A is disposed between the first oil discharge port 41F and the second oil supply hole $37C_1$. The second groove 51A is inclined in the same direction as the first groove 41H.

The second groove 51B is disposed between the first oil discharge port 41F and the second oil supply hole $37C_2$. The second groove 51B is inclined in the same direction as the first groove 41I.

With the rotating machine 50 of the second modification example of the first embodiment, by forming the second grooves 51A and 51B, which are inclined in the same directions as the first grooves 41H and 41I, in the central region $E_3$ positioned closer to the central side of the outer ring 32 than the outer side regions $E_1$ and $E_2$, the oil 39 supplied from the first oil supply holes 41D and 41E can be moved in a direction toward the first oil supply holes 41D and 41E.

For example, in FIG. 6, a case in which one second groove 51A and one second groove 51B are formed is described as an example, but the number of each of the second grooves 51A and 51B is preferably one or more, and is not limited to the number illustrated in FIG. 6.

Further, the position where the second grooves 51A and 51B are formed is preferably the central region $E_3$, but is not limited to the forming position of the second grooves 51A and 51B illustrated in FIG. 6.

Second Embodiment

Figure 7:
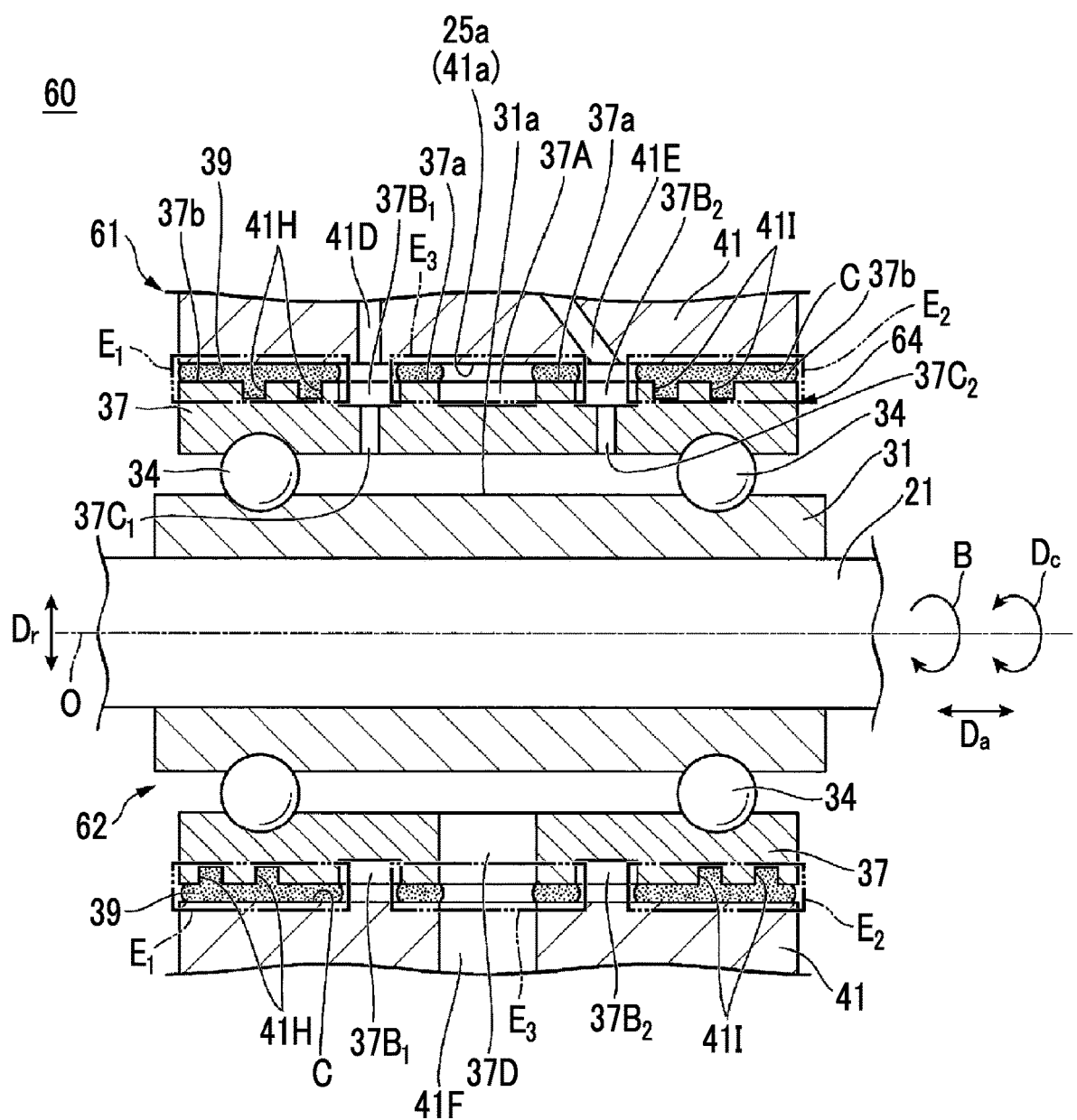
FIG. 7 is a sectional view schematically illustrating a principal section of a rotating machine according to a second embodiment of the present invention.

A rotating machine 60 of a second embodiment of the present invention will be described with reference to FIG. 7. In FIG. 7, the same components as the structure illustrated in FIG. 1 are denoted by the same reference numerals.

The rotating machine 60 is configured in the same manner as the rotating machine 11 except that the rotating machine 60 has a housing 61 and a bearing 62 instead of the housing 25 and the bearing 23 constituting the rotating machine 11 of the first embodiment.

The housing 61 is configured in the same manner as the housing 25 except that the first oil supply holes 41D and 41E are not formed.

The bearing 62 is configured in the same manner as the bearing 23 except that the bearing 62 has an outer ring 64 instead of the outer ring 32.

The outer ring 64 is configured in the same manner as the outer ring 32 except that the first grooves 41H and 41I are formed on the outer peripheral surfaces 37b corresponding to the outer side regions $E_1$ and $E_2$.

With the rotating machine 60 of the second embodiment, by forming the first grooves 41H and 41I on the outer peripheral surfaces 37b of the outer ring 64 corresponding to the outer side regions $E_1$ and $E_2$, the same effect as the rotating machine 11 described in the first embodiment can be obtained.

In the second embodiment, the second grooves 46A and 46B illustrated in FIG. 5 or the second grooves 51A and 51B illustrated in FIG. 6 may be formed on the outer ring main body 37.

Third Embodiment

Figure 8:
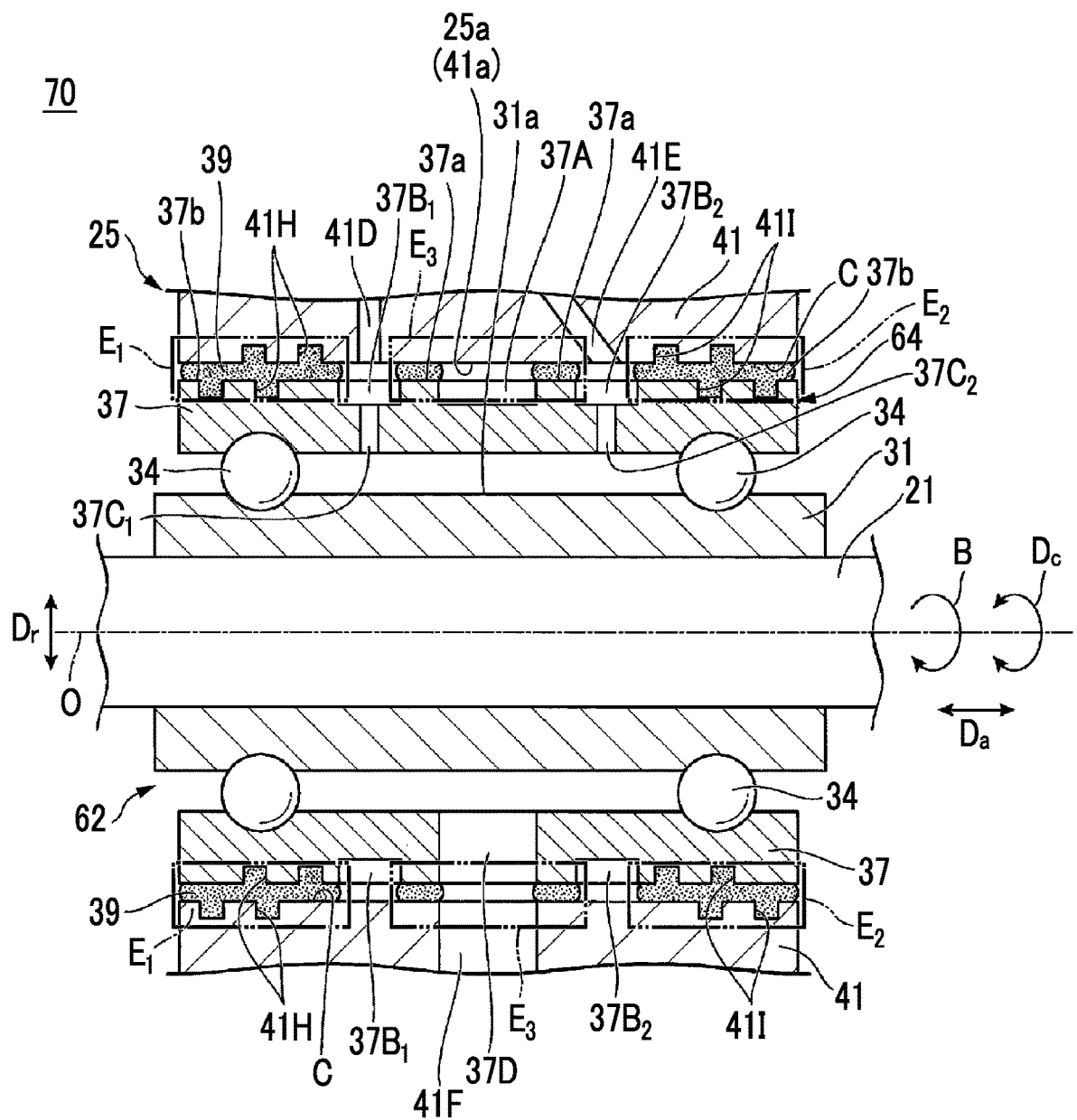
FIG. 8 is a sectional view schematically illustrating a principal section of a rotating machine according to a third embodiment of the present invention.

A rotating machine 70 of a third embodiment of the present invention will be described with reference to FIG. 8. In FIG. 8, the same components as the structure illustrated in FIGS. 2 and 7 are denoted by the same reference numerals.

The rotating machine 70 is configured in the same manner as the rotating machine 11 except that the rotating machine 70 has the bearing 62 described in the second embodiment instead of the bearing 23 constituting the rotating machine 11 of the first embodiment.

That is, in the rotating machine of the third embodiment, the first grooves 41H and 41I are formed on each of the housing 25 and the outer ring 64.

In a case where the first grooves 41H and 41I are formed on each of the housing 25 and the outer ring 64 as in the rotating machine 70 of the third embodiment, the same effect as the rotating machine 11 of the first embodiment can be obtained.

In the third embodiment, the second grooves 46A and 46B illustrated in FIG. 5 or the second grooves 51A and 51B illustrated in FIG. 6 may be formed on at least one of the outer ring main body 37 and the housing 25.

Fourth Embodiment

Figure 9:
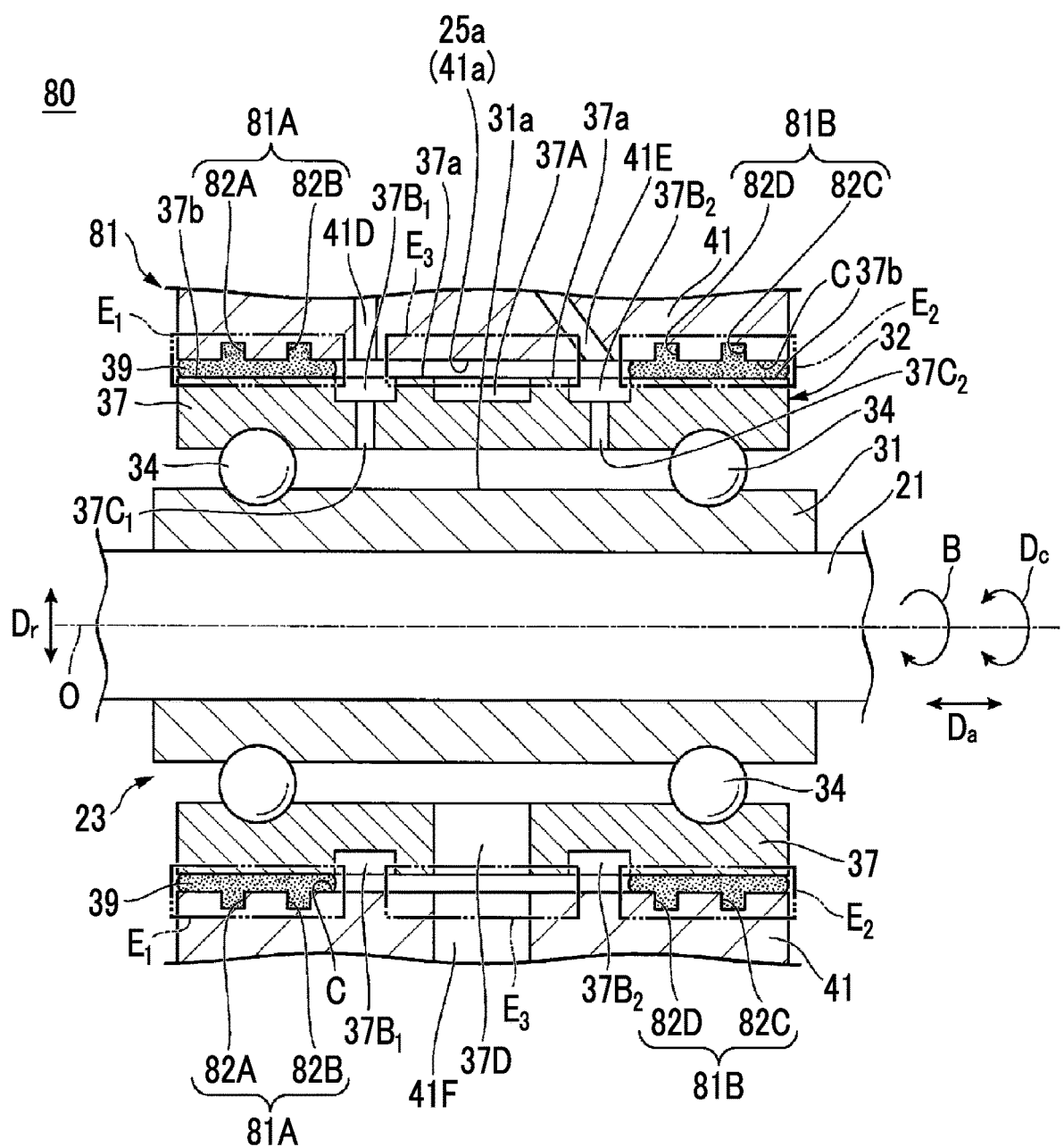
FIG. 9 is a sectional view schematically illustrating a principal section of a rotating machine according to a fourth embodiment of the present invention.
Figure 10:
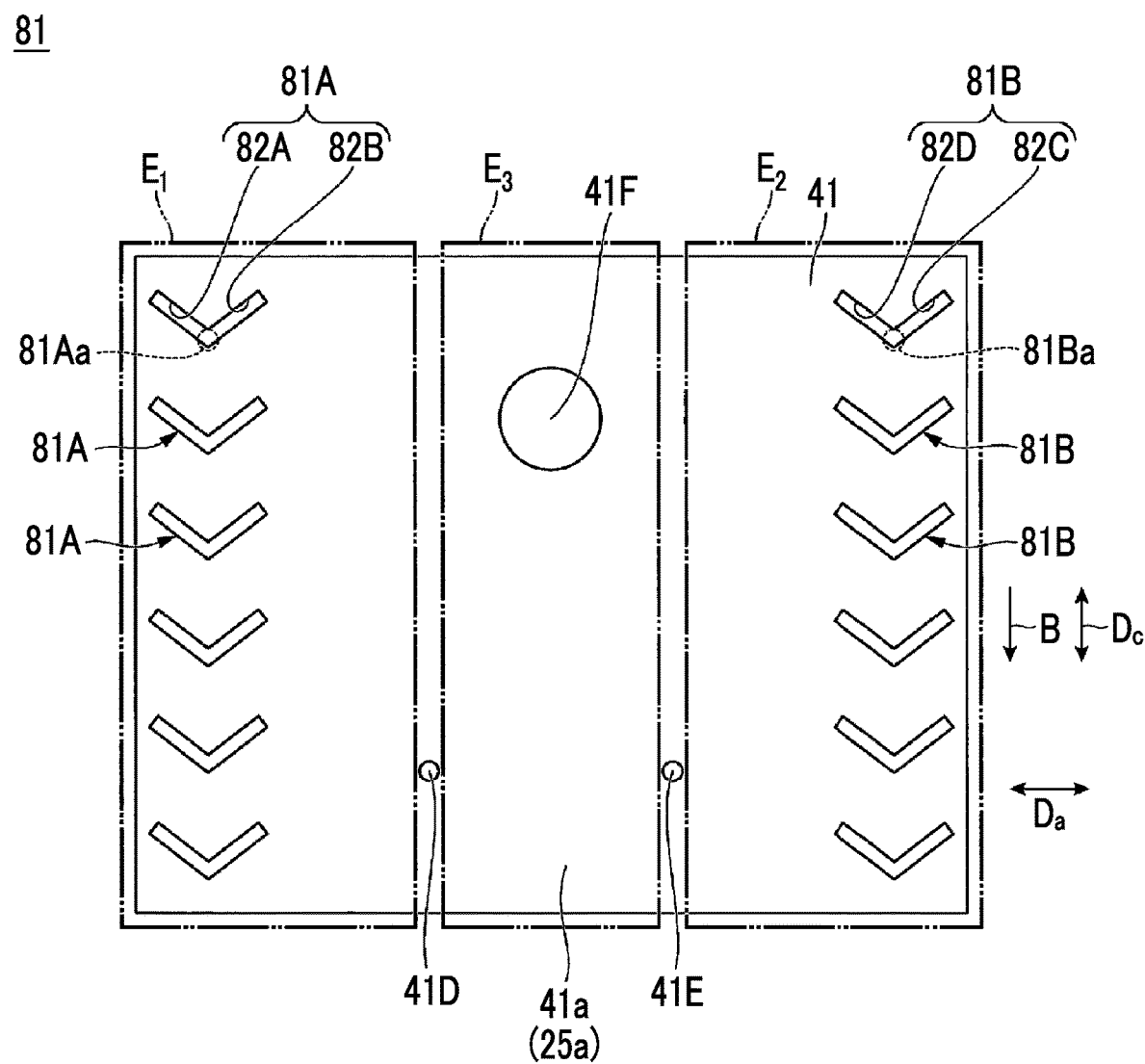
FIG. 10 is a diagram schematically illustrating a housing illustrated in FIG. 9 in a state where the housing is developed into a plate shape when viewed from the inner surface side of the housing.

A rotating machine 80 of a fourth embodiment of the present invention will be described with reference to FIGS. 9 and 10. In FIG. 9, the same components as the structure illustrated in FIG. 2 are denoted by the same reference numerals. In FIG. 10, the same components as the structure illustrated in FIG. 9 are denoted by the same reference numerals.

The rotating machine 80 is configured in the same manner as the rotating machine 11 except that the rotating machine 80 has a housing 81 instead of the housing 25 constituting the rotating machine 11 of the first embodiment.

The housing 81 is configured in the same manner as the housing 25 except that groove portions 81A and 81B are formed on the inner peripheral surface 41a of the main housing body 41 instead of the first grooves 41H and 41I formed on the housing 25 of the first embodiment.

The groove portion 81A has a first groove 82A and a third groove 82B.

The first groove 82A is formed on the inner peripheral surface 41a positioned on one end side of the outer ring 32, in the outer side region $E_1$. The first groove 82A is inclined in a direction toward the first oil supply hole 41D from one end of the outer ring 32.

The first groove 82A is a groove shorter than the first groove 41H described in the first embodiment. A plurality of first grooves 82A are formed at intervals in the circumferential direction Dc.

The third groove 82B is formed at a position adjacent to the first groove 82A in the axis direction Da, in the outer side region $E_1$. A plurality of third grooves 82B are formed at intervals in the circumferential direction Dc.

The third groove 82B is inclined in a direction opposite to the inclination direction of the first groove 82A. In the rotation direction B front side, one end of the third groove 82B and one end of the first groove 82A are connected.

A plurality of groove portions 81A configured as described above are formed at intervals in the circumferential direction Dc.

In a state where the rotating shaft 21 is rotated, in oil reservoir portion 81Aa which is a portion where one end of the third groove 82B and one end of the first groove 82A are connected (a part of the first and third grooves 82A and 82B), the oil 39 guided by the first groove 82A and the third groove 82B is likely to accumulate. The oil 39 accumulated in the oil reservoir portion 81Aa functions as a part of the oil film damper.

As the shape of the groove portion 81A configured as described above, for example, a V shape illustrated in FIG. 10 or a U shape (not illustrated) can be used.

The groove portion 81B has a first groove 82C and a third groove 82D.

The first groove 82C is formed on the inner peripheral surface 41a positioned on the other end side of the outer ring 32, in the outer side region $E_2$. The first groove 82C is inclined in a direction toward the first oil supply hole 41E from the other end of the outer ring 32.

The first groove 82C is a groove shorter than the first groove 41I described in the first embodiment. A plurality of first grooves 82C are formed at intervals in the circumferential direction Dc.

The third groove 82D is formed at a position adjacent to the first groove 82C in the axis direction Da, in the outer side region $E_2$. A plurality of third grooves 82D are formed at intervals in the circumferential direction Dc.

The third groove 82D is inclined in a direction opposite to the inclination direction of the first groove 82C. In the rotation direction B front side, one end of the third groove 82D and one end of the first groove 82C are connected.

A plurality of groove portions 81B configured as described above are formed at intervals in the circumferential direction Dc.

In a state where the rotating shaft 21 is rotated, in oil reservoir portion 81Ba which is a portion where one end of the third groove 82D and one end of the first groove 82C are connected (a part of the first and third grooves 82C and 82D), the oil 39 guided by the first groove 82C and the third groove 82D is likely to accumulate. The oil 39 accumulated in the oil reservoir portion 81Ba functions as a part of the oil film damper.

As the shape of the groove portion 81B configured as described above, for example, a V shape illustrated in FIG. 10 or a U shape (not illustrated) can be used.

With the rotating machine 80 of the fourth embodiment, by forming the third groove 82B, which is inclined in the direction opposite to the first groove 82A and of which one end is connected to one end of the first groove 82A on the rotation direction B front side, and the third groove 82D, which is inclined in the direction opposite to the first groove 82C and of which one end is connected to one end of the first groove 82C on the rotation direction B front side, the oil can be likely to accumulate in the oil reservoir portions 81Aa and 81Ba where one ends of the first grooves 82A and 82C and one ends of the third grooves 82B and 82D are connected, and therefore, it is possible to suppress that oil leaks from both ends of the outer ring 32.

In the fourth embodiment, the second grooves 46A and 46B illustrated in FIG. 5 or the second grooves 51A and 51B illustrated in FIG. 6 may be formed on the main housing body 41.

Figure 11:
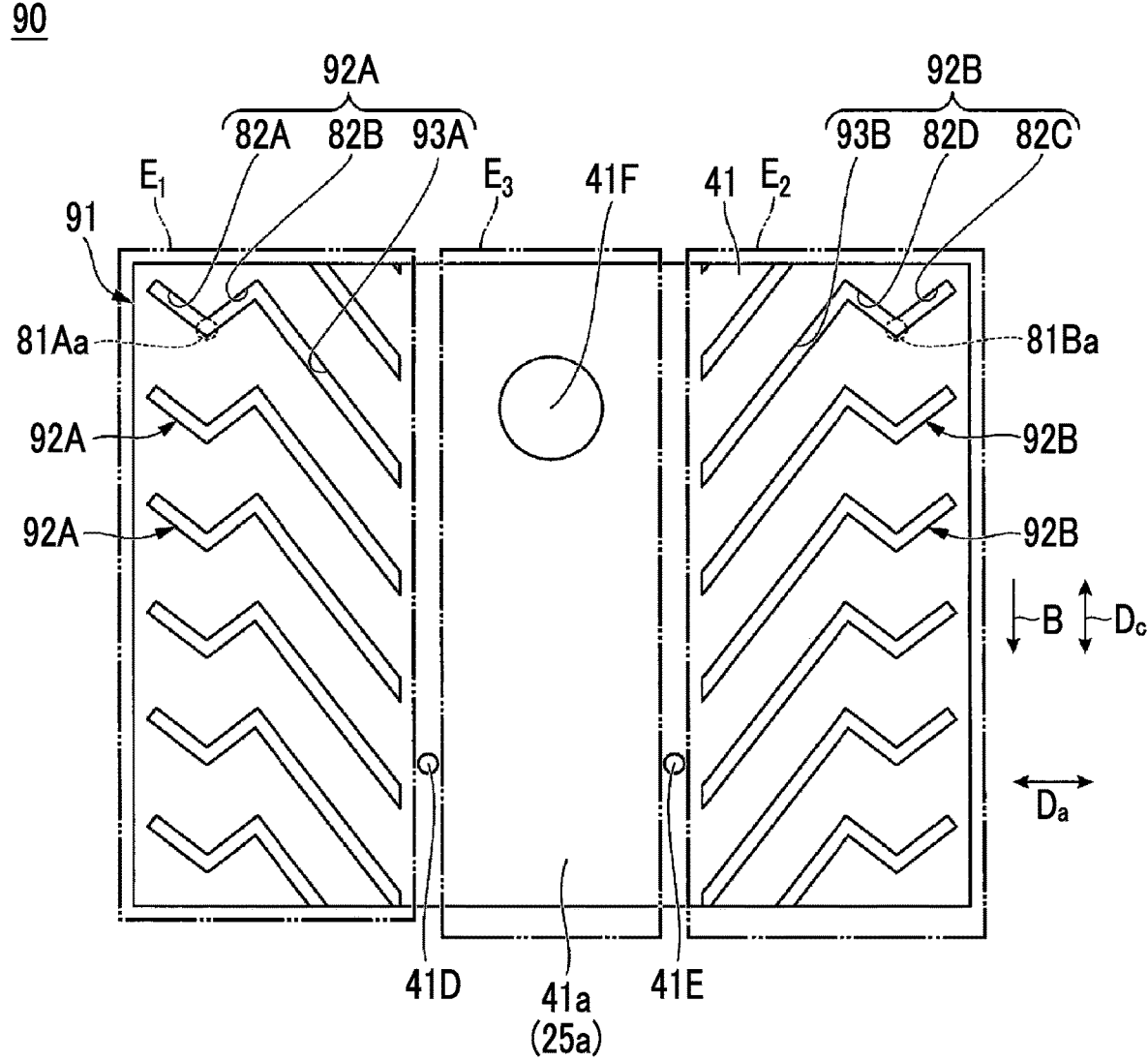
FIG. 11 is a diagram schematically illustrating a housing according to a first modification example of the fourth embodiment of the present invention in a state where housing is developed into a plate shape when viewed from the inner surface side of the housing.

A rotating machine 90 of a first modification example of the fourth embodiment of the present invention will be described with reference to FIG. 11. In FIG. 11, the same components as the structure illustrated in FIG. 10 are denoted by the same reference numerals.

The rotating machine 90 is configured in the same manner as the rotating machine 80 except that the rotating machine 90 has a housing 91 instead of the housing 81 constituting the rotating machine 80 of the fourth embodiment.

The housing 91 is configured in the same manner as the housing 25 except that groove portions 92A and 92B are formed on the inner peripheral surface 41a of the main housing body 41 instead of the groove portions 81A and 81B formed on the housing 81 of the fourth embodiment.

The groove portion 92A is configured in the same manner as the groove portion 81A except that the groove portion 92A has a fourth groove 93A in addition to the configuration of the groove portion 81A described in the fourth embodiment.

The fourth groove 93A is formed in the outer side region $E_1$ positioned between the third groove 82B and the central region $E_3$. The fourth groove 93A is a groove inclined in the same direction as the first groove 82A. The fourth groove 93A is a groove longer than the first groove 82A. A plurality of fourth grooves 93A are formed in the circumferential direction Dc. One end of the fourth groove 93A is connected to the other end of the third groove 82B.

The groove portion 92B is configured in the same manner as the groove portion 81B except that the groove portion 92B has a fourth groove 93B in addition to the configuration of the groove portion 81B described in the fourth embodiment.

The fourth groove 93B is formed in the outer side region $E_2$ positioned between the third groove 82D and the central region $E_3$. The fourth groove 93B is a groove inclined in the same direction as the first groove 82C. The fourth groove 93B is a groove longer than the first groove 82C. A plurality of fourth grooves 93B are formed in the circumferential direction Dc. One end of the fourth groove 93B is connected to the other end of the third groove 82D.

With the rotating machine 90 according to the first modification example of the fourth embodiment, by providing the above-described groove portions 92A and 92B, the oil can be guided in a direction toward the first oil supply holes 41D and 41E from both ends of the outer ring along the fourth grooves 93A and 93B. As a result, it is possible to further suppress that oil leaks from both ends of the outer ring.

In the first modification example of the fourth embodiment, the second grooves 46A and 46B illustrated in FIG. 5 or the second grooves 51A and 51B illustrated in FIG. 6 may be formed on the inner peripheral surface 41a of the main housing body 41.

Figure 12:
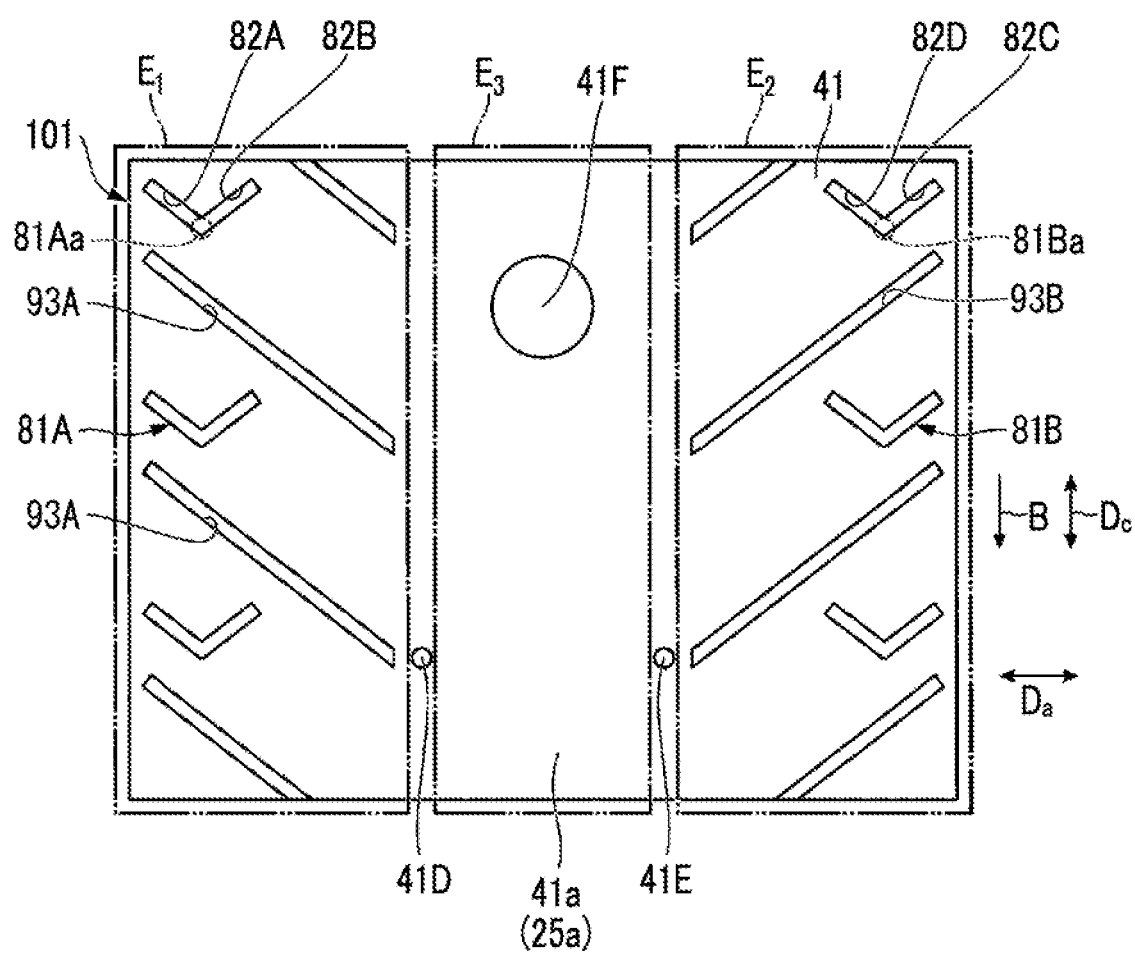
FIG. 12 is a diagram schematically illustrating a housing according to a second modification example of the fourth embodiment of the present invention in a state where housing is developed into a plate shape when viewed from the inner surface side of the housing.

A rotating machine 100 of a second modification example of the fourth embodiment will be described with reference to FIG. 12. In FIG. 12, the same components as the structure illustrated in FIG. 11 are denoted by the same reference numerals.

The rotating machine 100 is configured in the same manner as the rotating machine 90 except that the forming positions of the fourth grooves 93A and 93B constituting the rotating machine 90 of the first modification example of the fourth embodiment are different.

The fourth groove 93A is separated from the groove portions 81A, and a part of the fourth groove 93A is disposed between the groove portions 81A which are disposed adjacent to each other in the circumferential direction Dc.

The fourth groove 93B is separated from the groove portion 81B, and a part of the fourth groove 93B is disposed between the groove portion 81B Which are disposed adjacent to each other in the circumferential direction. Dc.

In the rotating machine 100 according to the second modification example of the fourth embodiment, the same effect as the rotating machine 90 according to the first modification example of fourth embodiment described above can be obtained.

The preferred embodiments of the present invention have been described above, but the present invention is not limited to a specific embodiment, and can be variously modified and changed within the scope of the present invention described in the claims.

For example, the first grooves 41H, 41I, 82A, and 82C, the second grooves 46A, 46B, 51A, and 51B, the third grooves 82B and 82D, and the fourth grooves 93A and 93B described in the first to fourth embodiments may be appropriately combined.

Further, the rotating machines 11, 45, 50, 60, 70, 80, 90, and 100 described in the first to fourth embodiments can be applied to devices other than the turbocharger.

INDUSTRIAL APPLICABILITY

The present invention can be applied to a rotating machine and a turbocharger.

REFERENCE SIGNS LIST

10: turbocharger
11, 45, 50, 60, 70, 80, 90, 100: rotating machine
12: thrust sleeve
12A: thrust collar
14: annular member
16: compressor wheel
18: turbine wheel
21: rotating shaft
23, 62: bearing
46, 51, 61, 81, 91: housing
25a, 41a: inner peripheral surface
31: inner ring
31a, 37a, 37h: outer peripheral surface
32, 64: outer ring
34: rolling body
37: outer ring main body
37A: first recessed portion
$37B_1$, $37B_2$: second recessed portion
$37C_1$, $37C_2$: second oil supply hole
37D: oil discharge hole
39: oil
41: main housing body
41B: oil supply pipe connection port
41C: oil distribution portion
411D, 41E: first oil supply hole
41F: first oil discharge port
41G: second oil discharge port
41H, 41I, 82A, 82C: first groove
46A, 46B, 51A, 51B: second groove
81A, 81B, 92A, 92B: cootie portion
81Aa, 81Ba: oil reservoir portion
82B, 82D: third groove
93A, 93B: fourth groove
B: rotation direction
C: clearance
Da: axis direction
Dc: circumferential direction
Dr: radial direction
$E_1$, $E_2$: outer side region
$E_3$: central region
O: axis

The invention claimed is:

1. A rotating machine comprising:
a rotating shaft extending along an axis;
a bearing which has an inner ring externally fitted onto the rotating shaft, an outer ring provided on an outer peripheral surface side of the inner ring, and rolling bodies disposed between the inner ring and the outer ring, and supports the rotating shaft such that the rotating shaft is rotatable around the axis; and
a housing which has an inner peripheral surface that forms a clearance, in which oil is disposed, between the inner peripheral surface and an outer peripheral surface of the outer ring, and a first oil supply hole that supplies the oil to the clearance,
wherein a groove portion, which guides the oil in a direction toward the first oil supply hole as the groove portion is directed to a rotation direction front side of the rotating shaft, is formed on at least one of the outer peripheral surface of the outer ring and the inner peripheral surface of the housing facing the outer peripheral surface of the outer ring,
an outer side end of the groove portion is formed not to reach an end of the housing,
the groove portion includes a first groove,
the first groove is inclined with respect to a rotation direction in which the rotating shaft is rotated and an axis direction when viewed in a radial direction of the rotating shaft,
the first groove is formed in an outer side region which is between the first oil supply hole and one of both ends of the outer ring which is close to a forming position of the first oil supply hole in the axis direction,
the first groove is inclined in a direction toward the first oil supply hole from the end of the outer ring, and
an inner side end of the first groove is disposed on an outer side of the first oil supply hole in the axis direction.

2. The rotating machine according to claim 1,
wherein a plurality of the first grooves are formed in the axis direction.

3. The rotating machine according to claim 1,
wherein the groove portion includes a second groove,
the second groove is formed in a central region positioned closer to a central side of the outer ring than the outer side region, and
the second groove is inclined in a direction opposite to the first groove or the same direction as the first groove.

4. The rotating machine according to claim 1,
wherein the groove portion includes a third groove,
the third groove is formed between a forming position of the first groove and the first oil supply hole in the outer side region, and is inclined in a direction opposite to the first groove, and
one end of the first groove and one end of the third groove are connected on the rotation direction front side.

5. The rotating machine according to claim 4,
wherein a plurality of the groove portions each including the first groove and the third groove are formed at intervals in a circumferential direction of the rotating shaft.

6. The rotating machine according to claim 4,
wherein the groove portion has a fourth groove which is formed in the outer side region and is inclined in the same direction as the first groove.

7. The rotating machine according to claim 6,
wherein a length of the fourth groove is longer than a length of the first groove, and
one end of the fourth groove is connected to the other end of the third groove.

8. The rotating machine according to claim 6,
wherein a length of the fourth groove is longer than a length of the first groove, and
the fourth groove is separated from the first groove and the third groove.

9. The rotating machine according to claim 1,
wherein the outer ring has
a recessed portion which is formed in a portion facing the first oil supply hole,
a second oil supply hole which is formed to penetrate the portion where the recessed portion is formed in a direction toward the rotating shaft, and supplies the oil to the rolling bodies, and
an oil discharge hole which is formed on a side opposite to a side where the second oil supply hole is formed, and discharges the oil.

10. A turbocharger comprising:
the rotating machine according to claim 1;
a compressor wheel provided to one end portion of the rotating shaft; and
a turbine wheel provided to the other end of the rotating shaft.

11. The rotating machine according to claim 2,
wherein one first groove of the plurality of the first grooves is inclined in a direction opposite to a direction in which another first groove of the plurality of the first groove is inclined.

12. The rotating machine according to claim 2,
wherein the outer side region includes a first outer side region and a second outer side region,
the first outer side region is a region between the first oil supply hole and one end of both ends of the outer ring,
the second outer side region is a region between the first oil supply hole and the other end of the both ends of the outer ring that is different from the one end of the outer ring,
one first groove of the plurality of the first grooves is formed in the first outer side region, and
another first groove of the plurality of the first groove is formed in the second outer side region.

13. The rotating machine according to claim 12,
wherein the first oil supply hole includes one first oil supply hole and another first oil supply hole,
the one end of the outer ring is an end to which a forming position of the one first oil supply hole is closer than a forming position of the other first oil supply hole in the axis direction,
the other end of the outer ring is an end to which the forming position of the other first oil supply hole is closer than the forming position of the one first oil supply hole in the axis direction,
the first outer side region is a region between the one first oil supply hole and the one end of the outer ring, and
the second outer side region is a region between the other first oil supply hole and the other end of the outer ring.

* * * * *